United States Patent Office 3,398,365
Patented Aug. 20, 1968

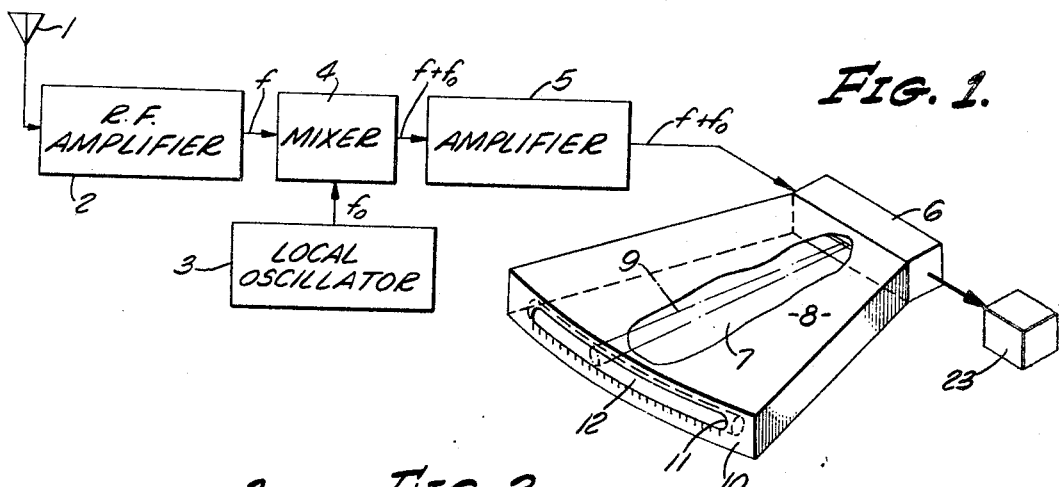
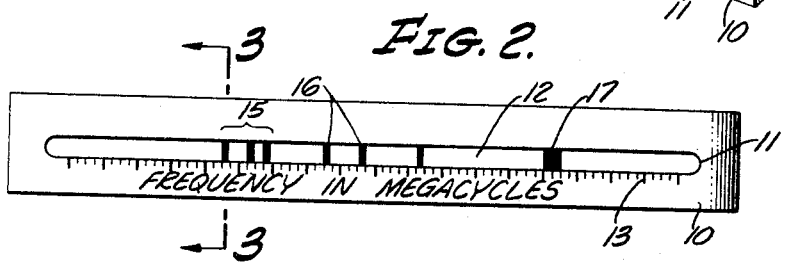

3,398,365
PANORAMIC SIGNAL DETECTOR AND DISPLAY
Shirly La Var Howard, Rolling Hills Estates, Calif., assignor to International Telephone and Telegraph Corporation, New York, N.Y., a corporation of Delaware
Filed Mar. 18, 1965, Ser. No. 440,806
13 Claims. (Cl. 324—77)

ABSTRACT OF THE DISCLOSURE

This disclosure describes a device for monitoring a frequency band of interest and capable of presenting a plurality of discrete indicia as functions of frequency, representative of all signals, CW, pulsed, FM or otherwise modulated and received within the said band of interest.

Heterodyne conversion of the signal band to the high microwave region (preferably in the vicinity of one centimeter or under) is provided to reduce overall size.

A frequency sensitive directive antenna (i.e., one which simultaneously forms a discrete beam narrow in at least a first coordinate corresponding to each discrete frequency at which a signal occurs in the said band) is provided. A scale is also provided and is placed such that the plural directive antenna beams impinge upon it in a geometric configuration not unlike the light beam galvanometer. The scale includes an electroluminescent surface which is caused to emit visible light wherever the said beams impinge upon it. Thus a display of signal presence and frequency is afforded when the luminescent scale is calibrated in accordance with the overall relationship of received frequency versus beam angle.

---

This invention relates to the problem of frequency detection and display as a function of frequency. More particularly, this invention relates to instantaneous passive detection of signals within a predetermined frequency band.

The need for monitoring a radio frequency (or rather a segment of the radio frequency spectrum) as for example the ultra high frequency region or microwave region, has been recognized in connection with a variety of purposes. Surveillance of a portion of the radio frequency spectrum finds broad application in connection with such activities as radio countermeasures, law enforcement, and even in connection with air and sea navigation situations.

Various approaches to the solution of the general problem presented have been generated, usually in connection with specific projects and for specific purposes. One of the best known approaches to the general problem of frequency band surveillance is the "scanned tuning" approach. In accordance with this concept a receiver is gradually (and usually at a uniform rate) tuned throughout a spectrum of interest. Some indicating means which may be a cathode-ray tube or an electromechanical recorder is synchronized with the tuning rate and the qualitative presence of signals is then related to frequency in the record produced. A rather obvious disadvantage to this approach is the fact that only continuously occurring signals are recognized. Any intermittent burst of radio frequency energy will only be recognized if it happens to correspond with the frequency with which the frequency scanned tuner is tuned at the time when the signal of interest occurs.

In the more general and practical situation the signal may appear only intermittently and accordingly, any means employed for analysis or surveillance of the spectrum must be capable of simultaneously receiving without hiatus over the entire band of interest in order to be truly effective and efficient. Of course it is possible to employ a plurality of receiving channels staggered throughout the spectrum of interest. The disadvantage from the point of view of size, cost and complexity involved in such an approach is obvious.

In accordance with the known disadvantages of these and other methods applied to the problem of surveillance of a frequency band, it is the general objective of the present invention to provide a frequency surveillance system which is simple, instantaneous, passive, and flexible in respect to matters such as calibration and selection of the general band of interest.

In describing the present invention drawings are included as follows:

FIGURE 1 is an overall block diagram with detailed pictorial of the indicating means.

FIGURE 2 illustrates a typical appearance of the indicating system in operation.

FIGURE 3 is a typical sectional view of one embodiment of the indicating device of FIGURE 2.

FIGURE 4 illustrates an alternative configuration for the indicating system of the invention.

The system according to the present invention herein described, overcomes the difficulties of and disadvantages of the prior art by means of a unique structure and method of frequency discrimination and presentation.

Referring now to FIGURE 1, the overall block diagram of the present invention is illustrated. The antenna 1 may be constructed in accordance with any one of a number of known antenna designs, the only requirement being that it responds adequately to a sufficiently broad band of frequencies corresponding to the total frequency band of interest. Insofar as the angle of radiation or reception or the horizontal plane and vertical plane directivity patterns of antenna 1 are concerned, these may be selected in accordance with the requirements of a particular situation. In the general situation, antenna 1 might be regarded as an omnidirectional device, without limiting the generality of the invention. In a particular spectrum surveillance situation, it is entirely possible that a highly directive antenna may be desired at 1. For example, in an array of forces in warfare, sharp directivity in the direction of enemy deployments to the exclusion of friendly signals to the rear might well be necessary. Suffice to say, antenna 1 is of conventional and known design.

The entire spectrum of signals received by antenna 1 is fed to an RF amplifier 2. This amplifier must also necessarily respond to the full spectrum of interest. In the microwave regions where the present invention is especially useful, a traveling wavetube amplifier is an obvious choice for the instrumentation of RF amplifier 2. Such a traveling wavetube amplifier is easily constructed to respond to a wide band of frequencies and to have sufficient sensitivity and sufficiently low noise to enable the presentation of signals ranging down to very low levels. The output of the RF amplifier 2 is then fed to mixer 4. Here again, the design of this particular element of the combination is straightforward. A mixer configuration as simple as the broadband microwave crystal mixer and oscillator combination will perform adequately in most instances. If maximum sensitivity and greatest signal-to-noise ratio is imperative, the more modern techniques of maser technology may be employed in instrumenting the mixer 4.

Local oscillator 3 to correspond with the selection of components previously listed for the microwave situation would be expected to be a klystron or other low power oscillator capable of operating at frequencies substantially higher than the highest frequencies within the surveillance band. For example, if the surveillance band was 8500 megacycles to 9500 megacycles (which is a band of interest in microwave technology), a frequency of operation on the order of 50 kilo megacycles would be required of the local oscillator. The reasons for the use of this extremely high local oscillator frequency will be apparent as this description proceeds.

Amplifier 5 must be capable of operation in the 60 kilo megacycle region corresponding to a wavelength on the order of five to six millimeters. In this instance, the microwave amplifier selected for amplifier 5 need not be of the high sensitivity or very low-noise types, but must be capable of effecting a fairly large power gain, since the requirements for operating the indicator array 6 and its associated components involve a fairly substantial amount of microwave power as will be discussed in more detail as this description proceeds. If the surveillance band of interest is identified by the small letter $f$ and the fixed operating frequency of the local oscillator 3 is identified as $f_0$, then the output of the mixer 4 is identified as $f+f_0$ and at the output of amplifier 5 is $f+f_0$ at a higher power level. Thus it will be seen that the indicator array 6 receives microwave power in the 60 kilo megacycle region. The indicator array 6 is an actual transmitting antenna designed for the millimeter wavelength corresponding to this very high frequency. The precise nature of the antenna array 6 will be discussed in more detail at a later point in this specification. However, suffice to say at this time it is of such a nature as to produce the beam 9 which is narrow in the dimension corresponding to the length dimension of the array 6. Also the angle of beam radiation is a function of the frequency $f+f_0$. It should be understood that the frequency $f+f_0$ is actually the band of frequencies corresponding to the surveillance band of frequencies being received by antenna 1, except now heterodyned to a higher frequency spectrum. If, within this band $f+f_0$ there are several or many signals, it follows from superposition theory that there will be a beam 9 corresponding to each discrete frequency within the band $f+f_0$. Moreover, since the indicating array 6 is frequency sensitive insofar as the angle of radiation of beam 9 is concerned, is follows that each separate beam corresponding to each discrete frequency within the band $f+f_0$ will assume an angular position corresponding to the frequency of the signal giving rise to it.

The next step in the instrumentation of the present invention involves the conversion of the angular information contained in the beam 9 and all other similar beams corresponding to received frequencies at any particular time to visible indicia. The actual details of the viewing surface 10 are subject to considerable variation within the scope of the present invention. Referring now to FIGURE 2, a typical configuration of the viewing surface 10 is illustrated. A surface 10 is provided with an elongated slot-window 11. Along the elongated dimension of the window 11 calibration marks 13 are shown. In this particular configuration of the viewing surface, the member which emits the visible light in response to the beams generated by antenna 6 shown in FIGURE 1, involves a gas-filled fluorescent tube not unlike those commonly used for lighting purposes.

Referring briefly to FIGURE 3, a sectional view taken through FIGURE 2 as shown, will be helpful in visualizing this structure. The fluorescent tube 12 is of course, not energized as would be the case with the ordinary fluorescent tube in a lighting application. For purposes of this invention, a fluorescent tube constructed without filaments or connections at either end but otherwise identical in respect to fluorescent coating, gas-filling and other features provides a satisfactory structure for the present invention. It will be seen from FIGURE 3 that the viewer observes the fluorescent tube 12 through the window 11. The appearance of signals on the fluorescent member 12 are depicted approximately in FIGURE 2. A group of CW signals at 15 are each as narrow as the design beamwidth of the antenna array 6 will permit. A pair of signals 16 are slightly broader than the CW signals indicating the presence of modulation sidebands. Signal 17 on the other hand, would be expected to be a frequency modulated transmission occupying a substantial amount of the surveillance spectrum. The appearance of a random frequency signal or a noise-modulated signal might be expected to give a similar appearance.

Returning now to FIGURE 1, it will be noted that the space between the antenna array 6 and the indicating surface 10 is enclosed by panels 7 and 8 on the top and bottom. It is expected that the inside of panels 7 and 8 and the inside surface 14 (FIGURE 3) of the indicating surface 10 would be constructed or coated with a material capable of a high order of radio frequency absorption. In this way it would be expected that multiple reflections within the partially enclosed space between 6 and 10 would be prevented and extraneous indications from this cause obviated.

Concerning the more specific details of an antenna array suitable for use at 6, U.S. Patent 3,039,097 discloses one of the several known structures employing a slotted serpentine distribution line which are available and suitable. It will be noted the aforementioned patent contemplates the direction of energy from the array slots against a parabolic reflector. The use of such a reflector in connection with array 6 of FIGURE 1, in the present application is not only possible but would actually lead to a greater overall power efficiency. The beam 9 could be narrowed in its broader cross-sectional dimension through the use of such a reflector and the overall beam intensity of the array 6 could be made substantially greater. Since a certain minimum energy level is necessary in order to produce satisfactory visible indications from the fluorescent member 12, the use of a reflector with the array 6 might be expected to reduce the power output required of the amplifier 5. A termination for the serpentine distribution line is shown at 23.

Turning now to FIGURE 4, it will be noted that several variations and alternatives in a presentation scheme of the present invention are illustrated. In FIGURE 4 the observer places himself behind the indicating array and looks beyond it to an indicating surface. In a radar or surveillance control center, for example, it may be possible to make use of a large wall-mounted presentation. If it were assumed that the indicating surface 22 is no more than a stripe of material capable of fluorescence when exposed to the beam 21 and other beams like it, a convenient display visible to a number of operators in a darkened or semi-darkened environment is afforded. The known techniques and effects referred to under the term electro-luminescence afford large possibilities for variations in the structure of the viewing surface 22. Essentially the same advantage is obtained as is well known in electrical instrumentation in connection with the light-beam galvanometer, i.e., a relatively small angle versus frequency sensitivity for the indicating array results in a substantial separation of indications when the distance between the array and indicating surface is comparatively great as in FIGURE 4. The array of U.S. Patent 3,039,097 is of course also suitable for the embodiment of FIGURE 4, but in order to illustrate clearly that various other configurations are possible in connection with the indicating array, FIGURE 4 shows a waveguide serpentine 19 fed at an end 18. At the slots, progressively phase energy is fed to a bank of horn antennas 20. Other antenna configurations will be obvious to those skilled in the art once the requirements for antenna structure are clearly understood in accordance with the present invention.

The indicating array, such as 6 in FIGURE 1, is by no means required to be linear. On the contrary any curve of beam angle versus frequency $f+f_0$ may be compensated through the use of a suitably non-linear frequency scale and the indicating surface of FIGURE 2.

Throughout the descritpion of the present invention the illustrations and description have been directed toward the conveyance of the concept of the present invention. It should be realized however, that many modifications and variations are possible within the spirit and scope of the present invention. One could, for example, conceive of a somewhat different type of radio frequency sensitive indicating surface. For example, a long series of microminiature radio frequency detectors might be assembled in a lineal arrangement which would respond to the impingement of the indicating array beam or beams. A corresponding lineal series of tiny indicating lamps each associated with one of the microminiature detector devices could also produce a visual indication albeit in discrete steps rather than on a substantially continuous basis as previously described in FIGURES 2, 3, and 4.

It is also to be noted that the foregoing description has always assumed that, whereas the indicating array 6 in FIGURE 1 is designed to operate at a wavelength in the millimeter range, "up conversion" was necessary for the handling of frequencies of surveillance in the ordinary ultra-high-frequency or radar spectra. Quite obviously, if there is design freedom and a willingness to use an indicating array in the same frequency band as the frequency band of surveillance interest, then no frequency conversion at all will be necessary. In such a system, only power amplification would be required between the receiving antenna and the indicating array. Particularly in the embodiment of FIGURE 4, where there is a large amount of room available, the larger array size and the necessary spacing between indicating array and indicating surface needed to insure that the indicating surface is beyond the Fresnel zone for the indicating ray may pose no great disadvantage. It is even conceivable, that in the event of a gallery size presentation with a very large indicating array "down-conversion" in the usual superheterodyne configuration may be entailed if the frequency band of surveillance interest is actually a very high one.

Notwithstanding the foregoing variations, the use of an array designed for millimeter wavelengths is thought to be the most practical approach to instrumentation of the present invention. A design for extremely high gain and therefore producing a very narrow indicating beam can be accomplished in the aforementioned millimeter wavelengths while still maintaining the size of the indicating array small enough to be grouped within an ordinary instrument assembly.

Another type of antenna array adaptable for the indicating array 6 is shown in U.S. Patents 2,596,113 and 2,596,966. Here, additional control of the beam angle corresponding to a given frequency is possible by varying the "A" dimension of the feed waveguide. This feature can be used for calibration purposes. Other variations and modifications will suggest themselves to those skilled in the art, and it is to be understood that the drawings presented herein are illustrative only and are not intended to define or limit the scope of the present invention. Accordingly, what is claimed is:

1. A panoramic frequency indicating system responsive to received signals in a predetermined band of radio frequencies, comprising the combination of: a receiving antenna having sufficiently broadband characteristics to receive signals in said predetermined band of radio frequencies; translation means connected to said receiving antenna to provide at least power amplification of said signals; display antenna means capable of simultaneously radiating a plurality of independent electromagnetic beams, connected to the output of said translation means, to develop a discrete beam of electromagnetic wave energy corresponding to each of said signals, said display antenna being of a type which produces separate and discrete beams each being radiated at a discrete angle, within a plane, said angle being a function of the frequency of the corresponding one of said signals; and display means positioned beyond the Fresnel zone of said display antenna to receive said beams and to give a luminous indication at a spatial point on said display means corresponding to each of said beams therefore corresponding to the frequency of each of said signals.

2. The invention set forth in claim 1 further defined in that said translation means includes a substantially fixed frequency local oscillator and mixer combination to provide heterodyne signals prior to said power amplification, thereby to supply signals to said display antenna in a different frequency band for adaptation to a particular physical design of said display antenna.

3. A frequency indicating system comprising: a first antenna of sufficiently broadband capability to receive all signals within a predetermined frequency band; a local oscillator and mixer circuit combination connected to receive said signals from said first antenna, said local oscillator being operated at a fixed frequency such that said signals are converted to a second frequency band substantially higher than the highest frequency expected within said predetermined frequency band; a power amplifier connected to receive and amplify signals in said second frequency band; an antenna array responsive to said amplified second frequency band, said antenna array being of a type which forms a beam of electromagnetic waves, narrow in at least one space coordinate for each discrete signal in said second frequency band, and radiates said beam at an angle in said coordinate which is a function of a corresponding frequency extant within said second frequency band; and an indicating surface arranged to be impinged upon by said beam and disposed generally normal to said beam at least at one point in the range of angles which said beam is capable of assuming, said indicating surface including a material which emits visible light at the point of impingement of said beam upon said indicating surface.

4. A radio frequency signal detecting and indicating system comprising: a broadband antenna for receiving all signals within a predetermined frequency band; means including a substantially fixed frequency local oscillator connected to said anetnna for generating a plurality of heterodyne signals, one corresponding each signal within said predetermined frequency band, said heterodyne signals having wavelengths in the millimeter regions; means for providing power amplification of said heterodyne signals; display means for visually presenting said signals as a function of frequency, said display means including an antenna array for forming a plurality of beams of electromagnetic wave energy each narrow in at least one plane and radiated at angles in said plane which are individually proportionl to the frequency of each of said heterodyne signals, and said display means also including a frequency calibrated scale, said scale being adapted for fluorescence and being so located that said beams impinge and cause fluorescent areas along said calibrated scale thereby to present all of said signals within said predetermined frequency band simultaneously and irrespective of the modulation or periodicity of said signals.

5. A frequency indicating system comprising: a first antenna for receiving all signals within a predetermined frequency band; a local oscillator and mixer circuit combination connected to receive said signals from said antenna, the frequency of said local oscillator frequency being fixed and such that said signals are converted to a second frequency band in the wavelengths below one centimeter; a power amplifier connected to receive and amplify signals in said second frequency band; an antenna array connected to the output of said power amplifier, said array being responsive to said second frequency band and the output of said power amplifier, and said array being of a type which forms a beam of electromagnetic waves narrow in at least one space coordinate, and radiates said beam at an angle in said coordinate which is function of a corresponding particular frequency extant within said second frequency band; and a calibrated indicating element arranged to be impinged upon by said beam and disposed generally normal to the axis of said beam, said indicating element including a material which emits visible light at the point of impingement of said beam upon said indicating surface, thereby to present indicia representative of each and every signal within said predetermined frequency band along said calibrated indicating surface.

6. The invention set forth in claim 5 further defined in that said indicating element consists of a closed, elongated, translucent, non-metallic tube having an inner coating of a material capable of becoming fluorescent and an ionizable gas within said tube, whereby said gas becomes ionized in a localized area under the influence of and at each location of impingement of said beam thereon, and said ionized gas causes a corresponding fluorescence of said inner coating.

7. The invention set forth in claim 5 in which a radio frequency preamplifier responsive to said signals within a predetermined frequency band is inserted between said first antenna and said local oscillator and mixer circuit combination.

8. In a panoramic frequency indicating system responsive to a predetermined band of frequencies ($f$) which includes a receiving antenna and superheterodyne conversion means utilizing a local oscillator operating at a substantially higher fixed frequency ($f_0$) than the highest frequency expected in said predetermined band thereby to produce a heterodyne signal ($f+f_0$), the combination comprising: a display antenna responsive to said heterodyne signals, said array being of a type which forms at least one beam of electromagnetic waves narrow in at least one coordinate perpendicular to the axis of said beam, and said array also being of a type which radiates said beam at a variable angle in said one coordinate as a function of variations in the frequency of said heterodyne signals; indicating means responsive to the impingement of said beam to produce visible light at an area on said indicating means corresponding to the impingement of said beam; and calibration means associated with said indicating means whereby the location of said visible light area is a direct function of ($f+f_0$) and thereby is associated with the frequency of any of said signals ($f$) as received by said receiving antenna.

9. In a panoramic frequency indicating system responsive to received signals in a predetermined band of radio frequencies, which includes a receiving antenna feeding superheterodyne conversion means utilizing a local oscillator operating at a substantially higher fixed frequency than the highest frequency expected in said predetermined band to produce a sum signal corresponding to each signal received by said receiving antenna within said predetermined band, the combination comprising: a second antenna responsive to said sum signals, said second antenna being of a type which forms a plurality of beams of electromagnetic wave energy, each narrow in at least one coordinate perpendicular to the direction of radiation, each of said beams corresponding to one of said received signals, said second antenna further defined in that it is of a type which radiates each of said beams at an angle in said one coordinate which is a function of the frequency of the corresponding one of said sum signals and therefore of the frequency of the corresponding one of said received signals; and indicating means including a member disposed and spaced opposite said second antenna and elongated in said one coordinate so that said beams strike said member along said elongation as a function of said angle at which each of said beams radiates, said indicating means further including means for emitting visible light at each point of impingement of said beams upon said indicating means.

10. The invention set forth in claim 9 further defined in that said member is spaced opposite said second antenna by an amount sufficient to place said member beyond the Fresnel zone of said second antenna, thereby to obtain sharp and discrete visible indications on said indicating means.

11. The invention set forth in claim 9 in which said elongated member is at least partially translucent so that said visible light is discernable to an observer disposed on the side of said indicating means opposite from the relative position of said second antenna.

12. The invention set forth in claim 9 further defined in that said indicating means are coated with a light emitting substance and the combination of said second antenna and said indicating means is adapted to be viewed from the side of said second antenna which is opposite said indicating means.

13. The invention set forth in claim 9 in which said elongated member is curved toward said second antenna such that the distance from any point along said elongated member to said second antenna is substantially invariant with respect to the center of radiation of said second antenna, thereby to linearize the scale factor of said indicating means as a function of said angles of said beams.

References Cited

UNITED STATES PATENTS

| | | | |
|---|---|---|---|
| 3,050,725 | 8/1962 | Kuecken | 324—78 X |
| 2,339,198 | 1/1944 | Smith | 324—79 |
| 2,437,281 | 3/1948 | Tawney | 343—778 X |
| 2,598,301 | 5/1952 | Rajchman | 324—77 |
| 2,753,524 | 7/1956 | Newsom | 324—79 X |
| 2,967,274 | 1/1961 | Hurvitz | 324—79 X |
| 3,039,097 | 6/1962 | Strumwasser et al. | 343—711 |
| 3,039,098 | 6/1962 | Bickmore | 343—783 X |
| 3,043,988 | 7/1962 | Hurvitz | 324—79 X |
| 3,286,260 | 11/1966 | Howard | 343—771 X |

OTHER REFERENCES

Michels: Electrical Measurements and Their Applications (1957), p. 21.

RUDOLPH V. ROLINEC, *Primary Examiner.*

P. F. WILLE, *Assistant Examiner.*